3,577,369
BARK FIBER AS A DISPERSING AGENT FOR HIGH TEMPERATURE MOLDING THERMOPLASTICS
Hubert E. Hendrickson and Charles N. McCain, Longview, Wash., assignors to Weyerhaeuser Company, Tacoma, Wash.
No Drawing. Filed Mar. 8, 1967, Ser. No. 621,420
Int. Cl. C08f 45/18
U.S. Cl. 260—17.4                                                4 Claims

ABSTRACT OF THE DISCLOSURE

The invention comprises the use of Douglas fir bark fiber as a dispersing agent for reinforced polypropylene molding compound which can be used at elevated molding conditions. The bark fiber may be incorporated into the reinforced molding compound by simple blending methods to provide a homogeneous molding premix, yet provide the article manufactured and produced thereby with the reinforcing material dispersed uniformly therein.

BACKGROUND OF THE INVENTION

In the art of molding thermoplastic compounds it is common practice to use reinforcing fiber material to upgrade the physical properties thereof. The fiber material is used where the plastic itself cannot provide the desired properties or where the same or better properties can be achieved at a lower cost. Thus, the use of reinforcing materials has always been of high interest to plastic molders where they can permit him to gain new markets by supplying a superior plastic material.

When molding high temperature thermoplastic compositions such as polypropylene, it has been the practice of some raw material suppliers and molders to incorporate therein reinforcing material such as asbestos, glass fibers, talc, and certain types of clay. An example of such a molding composition is illustrated and described in British Pat. No. 945,202. However, when employing these mineral fillers in a polypropylene molding composition, certain drawbacks have occurred in the dispersing of the reinforcing material throughout the molding compound. Thus, when asbestos is employed by simply blending with polypropylene flakes in a premix molding composition, the composition causes serious problems in injection molding machines because of bridging in the hopper. Ths bridging in the hopper is brought about by the asbestos fibers intertwining with each other to produce a material lacking the free-flowing characteristics necessary for uniform feeding. The intertwining also causes small balls of asbestos to form which are not subsequently redispersed and form unacceptable imperfections in the finished molding. When talc is blended with polypropylene molding compositions the material causes difficulties in screw-type injection molding machines because of excess slippage in the screw due to the lubricity of the talc material employed. This results in short shots causing, of course, rejection of the molding. In extreme cases it becomes impossible to even inject the compound into the die.

BRIEF DESCRIPTION OF THE INVENTION

The present invention comprises the finding that certain bark fibers can be used as an effective dispersing agent for the reinforcing agents and fillers frequently included in plastic molding compositions. The bark fibers employed in the present invention may be the caustic extracted alkali Douglas fir bark fiber or a substantially uncontaminated bark fiber that has been mechanically separated from contaminants such as cork and phloem tissue. The use of the bark fibers of the present invention with reinforced polypropylene make possible the use of simple physical mixtures of a fine particle size resin with the filler or reinforcing agent. The intensive compounding in high shear mixers followed by extrusion and pelletizing that were formerly necessary for satisfactory performance with materials of this type are no longer required. Problems such as hopper bridging, reinforcement separation and screw slippage, formerly encountered with simple physical mixtures, are overcome. The end result is a molded product with uniform distribution of a bark fiber and reinforcing materials that has been achieved at no special effort or expense on the part of the molder. Because of the uniform distribution of reinforcing agents the end product will have substantially more uniform physical properties and appearance.

DETAILED DESCRIPTION OF THE INVENTION

In the practice of the present invention substantially uncontaminated bark fibers are employed as a dispersing agent for a conventional reinforcing material in a polypropylene molding composition. The reinforcing material may be the conventional asbestos, glass fibers, talc, or clays. The bark fibers of the present invention are preferably those separated from raw bark with an aqueous alkali treating agent. As is well-known, raw Douglas fir bark contains cork and phloem tissue in addition to the fiber. When bark fiber having a high percentage of cork and phloem tissue, herein defined as contaminants, is used in polypropylene molding compositions, various adverse effects are noted during molding which detrimentally affect the end product. Thus, the Douglas fir bark fibers usable with the present invention may be prepared by reducing the raw bark to a particular particle size. The bark is then subjected to a chemical treatment in which it is reacted with an aqueous alkali treating agent broadly comprising a basic acting compound of an alkali metal or ammonium hydroxide, preferably sodium hydroxide. Other treating agents such as caustic potash, sodium carbonate, sodium bicarbonate and borax may be used. The bark is treated with the alkali material in either single or multiple stages, either batchwise or continuously with an alkali usage of from 5 to 25% and at a consistency of the bark of 5% to 40%. Appropriate amounts of water are used to produce these conditions. The treating time is variable although in general a period of from 30 to 180 minutes is adequate at a temperature range of ambient to above the boiling point. This treating process of the whole bark essentially removes all the contaminating materials from the bark fiber fraction which may be subsequently washed, dried and screened for use with the present invention. For a more detailed description of the process of obtaining the substantially uncontaminated bark fibers, reference is made to U.S. Pat. No. 2,890,231 and U.S. Pat. No. 2,345,869.

The bark fibers usable with the present invention may also be obtained by mechanically separating the bark fiber from the contaminating materials by first grinding the bark in a hammermill or the like and then screening in such a manner so as to separate the cork and other contaminating materials from the bark fiber. For a complete description of mechanically separating the bark fiber from the contaminating materials, reference is made to U.S. Pat. No. 2,446,551.

The Douglas fir bark fiber will have an average length of about 1 mm. and a length to diameter ratio of about 15:1. The Douglas fir bark fibers are hard and spindle-like in shape and have a substantially smooth outer surface. These characteristics of the bark fiber are essential to a successful operation of the present invention.

When the substantially uncontaminated bark fiber has been obtained, they are screened so as to provide a uniform size between those particle sizes which will fall through a 24-mesh screen and be retained on a 325-mesh Tyler screen. If a significant amount of material with a particle size larger than 24-mesh is present, imperfections will occur on the surface of the molding and the end product will not be acceptable. Also, dust problems can occur whenever particle sizes smaller than 325-mesh are present.

Before the bark fibers have been screened to a requisite size they are dried to a moisture content of about less than 8% based on the weight of the bone dry fiber but preferably between 2 and 4%. However, when molding reinforced polypropylene with bark fibers dispersed therein, up to 13% by weight moisture content is permissible when molding small parts. However, in most applications of the reinforced polypropylene molding compositions, large parts are formed and blistering will occur if the moisture content is above 8% because of the moisture vapor being driven off at the high molding temperatures. The specific gravity of the bark fibers is approximately 1.4. Also, the fibers are stiff rather than flexible. Moreover, when the bark fibers are intermixed with the polypropylene flakes and reinforcing or filler materials, the formation of bundles and balls of the mineral reinforcing material is essentially eliminated because of the stiffness and size of the fibers. It is hypothesized that the stiff and uniform sized bark fiber intermixed between asbestos or glass fibers, for example, hold them apart and thus eliminate the balling up problem experienced in the art. When talc or other powdered materials are employed that have high lubricity properties. the needlelike and stiff bark fibers tend to carry these powdered particles with them when fed into a screw-type molding injection machine thus eliminating the slippage problem experienced previously with these fillers.

The molding materials employed with the present invention may be those commercially available polypropylene compounds usable for molding compositions. These may be used in standard injection molding processes and apparatus. Examples of commercially available polypropylene compositions are "Profax," sold by Hercules Incorporated of Wilmington, Delaware; "Tenite," manufactured by Eastman Chemical Products, Inc., Kingsport, Tennessee; "Escon," by Enjay Chemical Company, New York, New York, and others. Basically these polypropylene materials must be molded at temperatures between 400 and 550° F. for optimum use. These materials are used for molding as sold, or for further processing with reinforcing materials and other ingredients. A preferred form for this invention is the flake or powder type, rather than the pellets.

Fillers or reinforcing agents are normally used in amounts approximating 20 to 40% by weight of the total mixture. It should be noted that the word "filler" must be considered in the same connotation as a reinforcing agent, since many materials added primarily as extenders may also contribute a significant improvement in some critical physical property. When the bark fiber is used as a dispersing agent and in conjunction with the reinforcing agent, it is normally present within the effective range of 5 to 25% by weight of compound. It is usually desirable to replace some of the mineral reinforcing material with an approximately equal volume of bark fiber. As an example, in a composition normally comprising 40% asbestos and 60% polypropylene by weight, about 20% by weight asbestos might be replaced by 10% by weight of bark fiber. In this example the ratio of polypropylene resin to other components remains unchanged on a volume basis, since the bark fiber has a specific gravity approximately one-half that of the mineral fillers. If substitution was made on an equal basis, the volume percentage of resin in the mixture might easily drop to such a low value that it would be difficult or impossible to mold.

When blending the polypropylene with the reinforcing materials and bark fibers, standard blending equipment may be employed to bring about a homogeneous mixture of the fiber and other materials throughout the polypropylene. Such mixing equipment may take the form of ribbon blenders, tumble blenders or the like. One of the problems heretofore encountered with simple mixtures of a flake polypropylene with asbestos or glass has been stratification or separation of the components during subsequent handling. This can easily reach proportions where usable moldings cannot be made. By the replacement of part of the mineral filler with an effective portion of bark fiber this separation is either greatly reduced or completely eliminated. It has been observed that during the mixing process an electrostatic charge is apparently created between the bark fiber and the polypropylene due to the frictional forces created during the intermixing of the components. This phenomena attracts the fibers to the polypropylene and aids in the elimination of stratification. The electrostatic charge soon fades upon standing but will again rapidly build up on subsequent handling. The particular length and diameter of the fibers will also retain the other reinforcing material within the premix thus greatly reducing or eliminating stratification. The intermixed bark fibers, reinforcing material and polypropylene can be pelletized, if desired, but this is not necessary since they can be employed in the molding operation as a premix without separating or without the troublesome bridging of molding machine hoppers normally experienced with glass or asbestos premixes.

In the process of forming a reinforced polypropylene molded product with the composition of the present invention, the premix is merely poured into a standard injection molding machine hopper and is fed by the screw to an exit orifice and thence to the mold. The temperature of the molding may be from 360° F. to as high as 430° F., with a preferred range of 370° F. to 400° F. Products formed using the composition of the present invention have superior physical characteristics due to the excellent dispersion of the reinforcing agent throughout the matrix of the molding composition. In this regard it should be noted that the bark fibers themselves help to provide good physical characteristics to the end product since they are stiff fibrous materials. It is surprising that such excellent results are achieved using the bark fiber which is lignocellulosic in nature. One would ordinarily expect that scorching problems would be troublesome. This has not been the case, however, in the temperature range disclosed and at the times normally involved in the molding operation.

The following examples will serve to illustrate the best known mode of operation of the invention:

Example I

In order to illustrate the handleability of the dry blend of polypropylene, talc and the bark fibers of the present invention, a conventional flake polypropylene molding resin was obtained and intermixed with various amounts of a reinforcing talc material and various amounts of the bark fibers. The talc and bark fiber were kept at an approximately constant volume basis in relationship to the total resin. The mixing was in a standard blending machine until a uniform mixture was obtained. The molding material was then fed into the screw feed of the injection molding machine. The results of these tests are illustrated in the following table:

TABLE I

| Dry blend, formulation percent by weight | | | |
|---|---|---|---|
| Polypropylene | Bark fiber | Talc | Handleability of dry blend |
| 60 | ------- | 40 | Could not mold part. Material slipped in screw feed of injection molding machine. |
| 65 | 5 | 30 | Could not mold part. Material slipped in screw feed of injection molding machine. |
| 70 | 10 | 20 | Feeds quite well. |
| 75 | 15 | 10 | Feeds very well. |

Example II

The experiment as set forth in Example I was repeated but substituting anthophyllite asbestos for the talc. The result of these experiments are tabulated in he following able:

TABLE II

| Dry blend, formulation percent by weight | | | |
|---|---|---|---|
| Polypropylene | Bark fiber | Asbestos | Handleability of dry blend |
| 60 | ------- | 40 | Bridges in hopper, must be forced down by hand. |
| 65 | 5 | 30 | Occasional bridging in hopper. |
| 70 | 10 | 20 | Rarely bridged in hopper. |
| 75 | 15 | 10 | Feeds automatically; no bridging. |

Example III

The compounds of Example II, after blending, were placed in 16-ounce glass jars and severely vibrated for one minute to make a visual observation of any stratification or separation. The results of the experiment are tabulated in the following table:

TABLE III

| Dry blend, formulation percent by weight | | | |
|---|---|---|---|
| Polypropylene | Fiber | Asbestos | Separation observed |
| 60 | 0 | 40 | Severe separation of asbestos. |
| 65 | 5 | 30 | Considerable separation of asbestos. |
| 70 | 10 | 20 | Very little separation of asbestos. |
| 75 | 15 | 10 | Little or no separation of asbestos. |

As it can be seen from the above description and examples, by adding an effective percentage of Douglas fir bark fiber to the molding materials the problems of bridging and feeding can be substantially eliminated.

While various specific examples of preferred procedure embodying the above invention have been described above, it will be apparent that many changes and modifications may be made in those methods of procedure without departing from the spirit of the invention. It should therefore, be understood that the examples cited and methods of procedure set forth are intended to be illustrative only and not intended to limit the scope of the invention.

What is claimed is:

1. A thermoplastic molding premix comprising a particulate polypropylene molding resin, a Douglas fir bark fiber dispersing agent, and a reinforcing material selected from a group consisting of asbestos, talc, glass fibers, and clay, or mixtures thereof, said Douglas fir bark fiber being present in an amount ranging between 5 and 25% by weight, said bark fiber and reinforcing agent being dispersed throughout said molding composition to provide a uniform mixture.

2. The thermoplastic molding composition premix as set forth in claim 1 wherein the Dogulas fir bark fiber may range between 24 and 325-mesh.

3. The premix of claim 1 wherein the moisture content of said Douglas fir bark fiber may range up to 8%.

4. The premix of claim 1 wherein the size of said Douglas fir bark fiber may range between 24 and 325-mesh and have a moisture content of up to 8%.

References Cited

UNITED STATES PATENTS

| 2,446,551 | 8/1948 | Pauley | 209—311X |
| 2,697,081 | 12/1954 | Heritage | 260—17.2 |
| 2,890,231 | 6/1959 | Heritage et al. | 260—412.5 |
| 3,245,869 | 4/1966 | Gregory et al. | 162—55 |
| 3,361,690 | 1/1968 | Gregory et al. | 260—17.4 |

FOREIGN PATENTS

| 675,907 | 12/1963 | Canada. |

OTHER REFERENCES

Modern Plastics Encyclopedia for 1966, September 1965, p. 594.

WILLIAM H. SHORT, Primary Examiner

E. A. NIELSEN, Assistant Examiner